June 10, 1958   W. D. MUNRO   2,838,683
CURVE FOLLOWER
Filed July 18, 1955

INVENTOR.
WILLIAM D. MUNRO
BY
Barlow & Barlow
ATTORNEYS 2,838,683

CURVE FOLLOWER

William D. Munro, Attleboro, Mass.

Application July 18, 1955, Serial No. 522,795

2 Claims. (Cl. 250—227)

This invention relates to a curve follower, more particularly to an instrument that may be utilized with various types of recorders or similar instruments to generate an electrical output so as to change the follower's position relative to the edge of a curve drawn on a piece of chart paper as the chart paper is moved under a follower.

There are varied applications where it is desired that a function drawn on a chart or graph paper be reproduced at a remote location. The operating conditions for such a following device demand that the response be instantaneous and also that the follower be able to respond to curves which are characterized by sharp peaks. Prior art devices which may be utilized in this function do not meet the basic conditions of operation.

It is therefore an object of this invention to provide a curve follower which has a high resolution following capability.

Another object of the invention is to provide a curve follower or scanning device which is small in size and weight and may be readily installed in existing equipment.

A further object of the invention is to provide a device which will project a very small point of light and which will incorporate a device to pick up the reflected light from the illuminated area and convert this picked-up light into electrical signals which are representative of the quantity of the light.

With these and other objects in view, the invention consists of certain novel features of construction as will be more fully described and particularly pointed out in the appended claims.

In proceeding with this invention, I provide a curve follower consisting of a casing in which a miniature lamp may be mounted and affix to the end of this casing a lens means in the form of a cylinder for transmitting light from the source to the end of the lens means and thence on to a paper or other object. Mounted in this lens means is a photoelectric cell that is oriented to pick up light on a parallel axis to the axis of projection of the light source.

Figure 1:
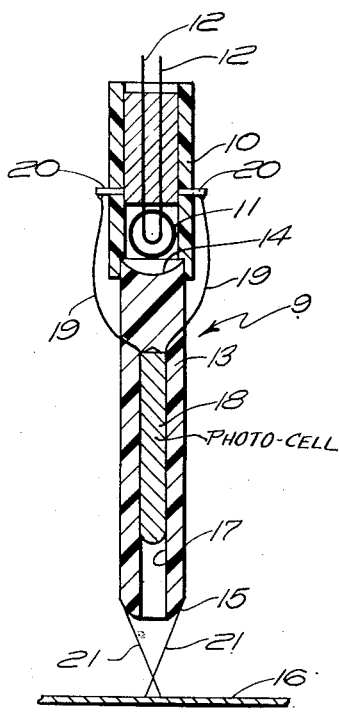
Figure 1 is an elevational view in section, showing the curve follower constructed in accordance with this invention.
Figure 2:
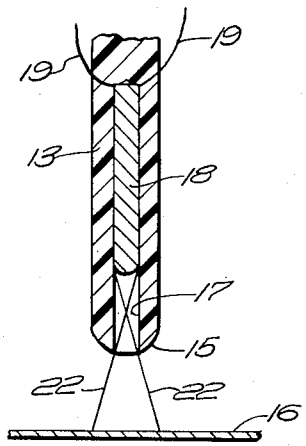
Figure 2 is a partial sectional view of the lens and pick-up portion of the device.

Referring now to the drawings, there is shown a curve follower comprising a casing 10 of cylindrical form in which there is mounted a miniature electric bulb 11 which is shown schematically and is connected to a source of electricity through leads 12. To one end of the casing 10 there is suitably secured a rod 13 which is provided at its end adjacent the electric bulb 11 with a concave parabolic surface 14 and at its far end with a convex parabolic surface 15. This rod 13 conducts light from the source 11 to the end thereof where it is projected upon a surface 16, the parabolic surfaces tending to converge the rays. To effect this result, the rod 13 is preferably made from a material which has the optical properties of quartz, such as "Lucite," "Plexiglass" (methyl methacrylate resin), or any other equivalent material. The center of the rod 13 is drilled with a hole 17 part way therethrough so as to receive a miniature photocell unit 18. This photocell unit 18 has connection leads 19 leading from the end of the hole 17 to terminal posts 20 that are affixed to the casing 10 and may consist of a type 1N77A junction photo-diode or an equivalent thereof. It will be apparent from the foregoing that light from the miniature bulb 11 is transmitted through the rod 13, passing on either side of the photocell unit 18, and is projected on the paper or surface 16 substantially as represented by the light projection lines 21. By reason of the parabolic surface 15 there is a focusing effect or a lens effect that takes place, providing a very narrow beam on the surface 16 for a given distance away from the surface, which is generally a very small amount in the order of magnitude of under ⅛ inch. It will also be noted that the photocell 18 is mounted within the interior of the rod 13 in such a way that the hole 17 provides a direct air path between the end of the photocell 18 and the surface 16. The outside edges of the hole 17 limit the area of pick-up of the photocell 18 and may be generally represented by the projection lines 22, as shown in Figure 2. These projection lines define an area which is larger than the area defined by the light as shown in Figure 1. It should be pointed out, however, that by reason of the direct air path between the photocell 18 and the surface 16, such an air path pick-up by the photocell gives a maximum signal to noise ratio and provides optimum operation of the device.

Figure 3:
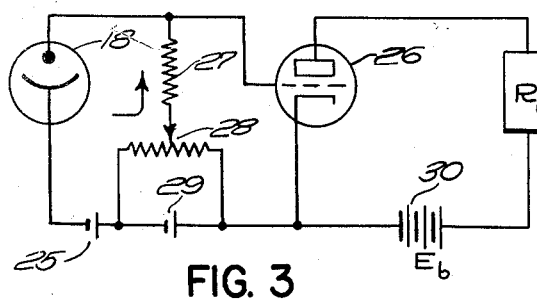

The curve follower of my invention may be utilized in a variety of ways. For instance, the output of the photocell 18 may be applied to a standard reverse D. C. phototube circuit such as is shown in Figure 3. This is a standard circuit in which the increase of illumination causes a decrease of plate current in the amplifier tube. Briefly describing this circuit, there is shown schematically the phototube 18 having a source of voltage 25 connected thereacross. The photocell is effectively connected between the grid and the cathode of amplifier tube 26, there being in the grid cathode circuit a grid resistor 27 and a grid bias rheostat 28, the latter being connected across a grid voltage source 29. The amplifier tube 26 is provided with plate voltage through a battery 30 and a load represented as $R_L$ is connected between the plate and cathode. Thus, there will be reflected in this load $R_L$ a voltage change which will be proportional to a change in illumination of the photocell 18 that may be utilized in a variety of ways. For instance, the load $R_L$ might feed or even be represented by a meter 31 which would give a visual indication of "on" or "off" a curve.

Figure 4:
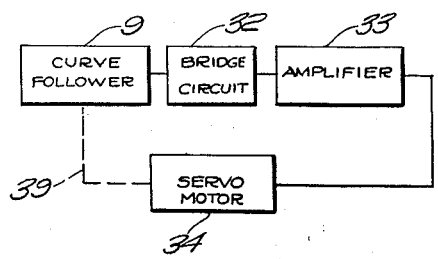
Figure 4 is a circuit diagram showing one form of application of the invention.

A typical application of the device is shown in Figure 4 wherein the curve follower 9 is shown as connected to a bridge circuit 32 that then feeds an amplifier 33. The output of the amplifier is then coupled to a balancing motor and servo-follower mechanism 34, the mechanical output of which is coupled to the mounting means for the curve follower 9, the coupling being designated by dotted line 39. By way of explanation, the curve follower and bridge circuit 9 and 32, respectively, may be represented by the schematic circuit of Figure 5, in which the photocell 18 is provided with electromotive force 35 and the bridge circuit comprises two impedances 36 and 37 herein shown as resistances. It will be apparent to those skilled in the art that the photocell 18 may be considered for analytical purposes as a variable impedance device, the impedance decreasing upon an increase in light. With the tap 38 of the impedance 37 being adjusted to a balanced condition for a given condition of light being transmitted to the photocell, it will be apparent that when the light varies one way or the other from this set condition that the bridge will unbalance across the terminals marked "out" either in one direction or the other depending upon the impedance variation from the steady state condition.

Referring now to Figure 4, it will be seen that with this system in use in the schematic view therein shown, the output of the amplifier 33 will vary in accordance with the variation of the photocell. This variation may be utilized to actuate a balancing servomotor mechanism, the output of which is mechanically connected as by a linkage 39 to the mechanism holding the curve follower. With proper connections being made, it will be apparent that this output may then correct the position of the curve follower, returning it to a circuit balanced condition.

Figure 6:
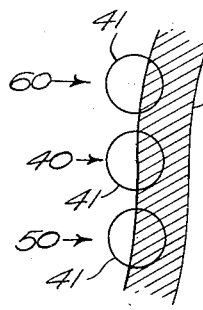
Figure 6 is a greatly enlarged fragmentary view of a curve which will be referred to in explaining the operation of the invention.
Figure 5:
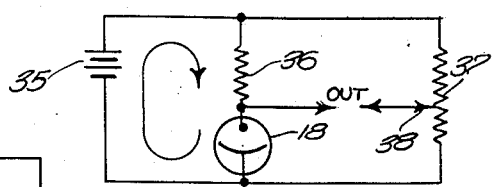
Figures 3 and 5 are circuit diagrams showing two photocell input circuits which may be utilized to produce the voltage output of the device.

Referring to Figure 6, let us assume that position 40 is the steady state or normally adjusted position to secure balance in the bridge circuit 32 which is represented by Figure 5. In Figure 6 the curve being followed is represented by the shaded area 42, and the spot of light being projected by the rod 13 is represented by the circles 41. In this balanced position represented by position 40, it will be seen that the curve 42, which is of a size much larger in magnitude than the diameter of the spot of the light represented by circle 41, covers approximately one half of the area of the spot of light 41. Assume that the follower has moved to position 50. At this position the curve 42 is encroaching more and more over the area 41 projected by the light. Less light is therefore transmitted to the photocell 18, and the connections of the servo balancing motor 34 are such that it will tend to move the curve follower to the left as viewed in the drawings to again balance it as in the condition shown in position 40. On the other hand, assume that the light spot and curve are oriented as shown in position 60. At this position more light is being reflected back to the photocell 18, and this will cause an unbalance in the opposite direction to that of position 50, giving an opposite response to the servomotor, which will turn the curve to the right as viewed in Figure 6.

It will thus be appreciated that I have provided a device which generates a very fine spot of light in the order of a few thousandths of an inch in diameter, which will be highly responsive to following curves, as described above. Various modifications and applications of the invention will, of course, suggest themselves to those skilled in the art. Accordingly, the foregoing should be interpreted as illustrative only and not in a limiting sense, except as defined by the appended claims.

I claim:

1. A curve follower probe comprising an elongated casing having a central major axis, a source of light positioned axially in said casing, an elongated member axially aligned with said axis, said member having the property of conducting light in a path parallel to such axis, lense means at one end in said elongated member and concentric with said axis for directing light from said source in the form of a circular spot on to a surface, an axial bore in said elongated member adjacent said end, a photodiode in said bore to receive light reflected from such surface in a path parallel to said axis.

2. The structure defined in claim 1, wherein one end of the elongated member is positioned adjacent the source of light and wherein said lense means comprises a convex parabolic surface on the other end of the elongated member.

References Cited in the file of this patent

UNITED STATES PATENTS

| 2,261,644 | Cockrell | Nov. 4, 1941 |
| 2,420,716 | Morton et al. | May 20, 1947 |